UNITED STATES PATENT OFFICE.

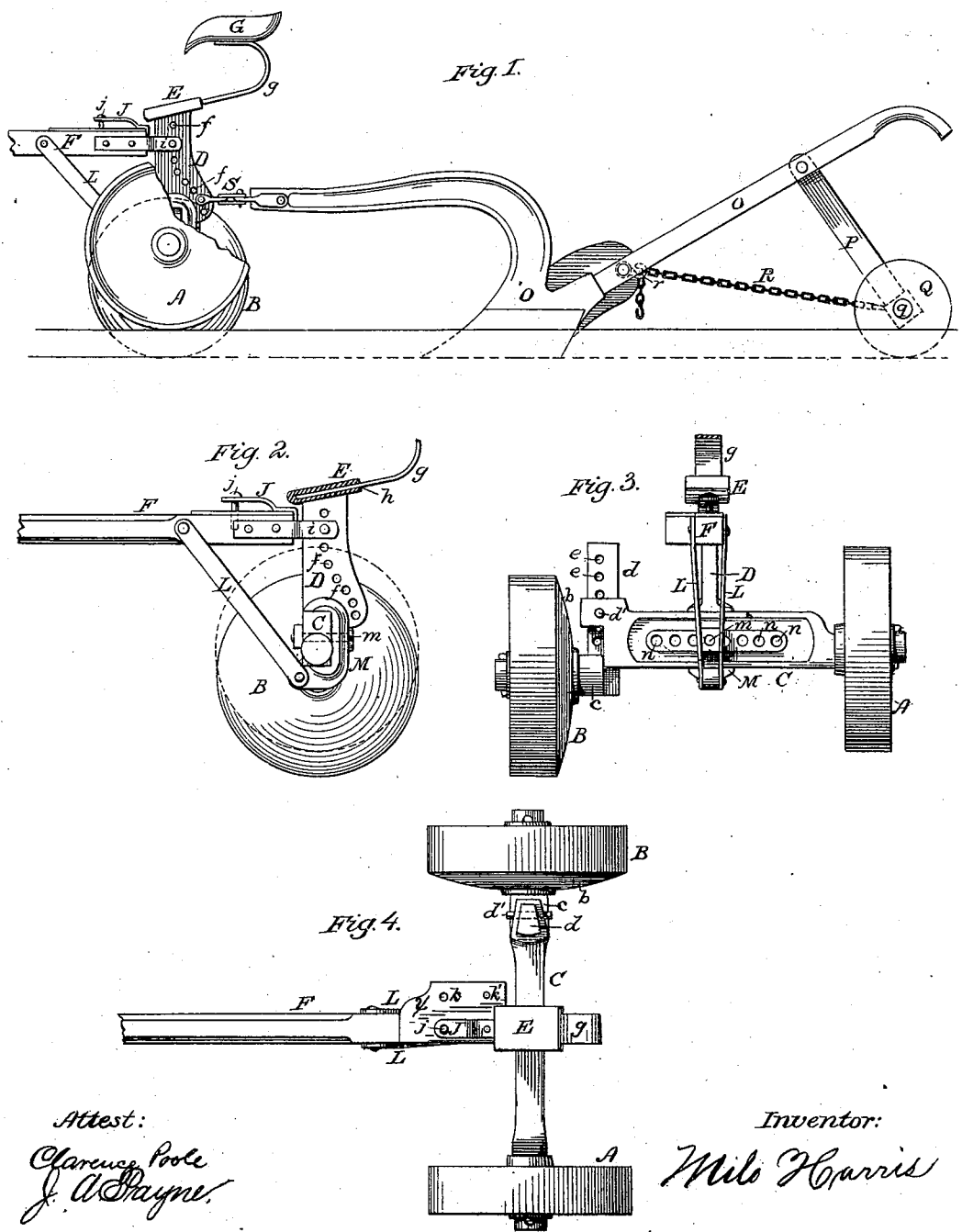

MILO HARRIS, OF JAMESTOWN, NEW YORK.

IMPROVEMENT IN FARM-TRUCKS OR DRAFT ATTACHMENTS FOR PLOWS OR HARROWS.

Specification forming part of Letters Patent No. 215,918, dated May 27, 1879; application filed November 9, 1878.

*To all whom it may concern:*

Be it known that I, MILO HARRIS, of Jamestown, in the county of Chautauqua and State of New York, have invented certain new and useful Improvements in Farm-Trucks or Draft Attachments for Plows, Harrows, &c.; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to provide that class of farm-trucks that are used in front of plows, harrows, and other farm implements with a more efficient draft attachment; and consists in making the truck-axle in two parts, so that one wheel can be lowered into the furrow when plowing, a bevel-wheel to run in the furrow, a movable seat, pole-connections that three horses may be used, when desired, together with a plow-holder attachment, as will be hereinafter more fully set forth.

In the accompanying drawings, Figure 1 is a side view of truck with plow and holder attached; Fig. 2, side view of truck with wheel removed; Fig. 3, front view; Fig. 4, plan view.

In the drawings, C represents the main body of truck-axle, made of suitable metal, and preferably longer in its vertical than horizontal dimensions, having a spindle on one end for the wheel A, and at the other a dovetail mortise, as shown in Fig. 4, and raised projection, through which the standard $d$ of the spindle $c$ slides, so that the wheel B may be lowered into the furrow to any desired depth when plowing, and held in such position by the bolt $d'$, passing through this raised mortise of axle C and holes $l$ of the standard $d$.

The wheel B is raised in line with wheel A, and securely fastened by bolt $d'$, when the truck is used for other purposes.

The wheel B has its side running next to the unplowed land made on a bevel, as shown, the object being (that as this wheel gages the width to be cut by the plow) to have it press against the bank near the center, as the same amount of friction will have less tendency to retard the velocity of the wheel than when pressing near the circumference. It also prevents taking up any dirt by the rim of the wheel. Yet I do not wish to confine myself to this particular construction of wheel, as I find the common wheel serves a very good purpose.

The standard D is made of suitable metal, and has a gain cut near its base, so as to pass onto the axle C from the back side, and its extreme lower end projects forward beyond the edge of the axle far enough to have the lower end of braces L fastened securely to it by a bolt. The standard D is fastened to the axle by bolt $m$, passing through holes $n\ n$, and can be adjusted from the center each way.

The standard D has a series of holes, $f$, so as to adjust the plow, or any other implement to which it is attached, to any desired height, the connections being made by a clevis. The pole F is connected to this standard by metal straps $i$, fastened by a bolt through one of the holes $f$ near the top, said straps being securely bolted to the rear end of the pole, as shown in Figs. 1 and 2. Braces L have their upper ends secured to the pole by a bolt in front of the hammer-strap J, and as their lower ends are fastened to the bottom of the standard the line of draft is always above it, so in case of a high draft the truck will not be lifted from the ground.

The top of the standard D is cast solid with cap E, that is made to extend over the vertical line of the standard, and is provided with a mortise, $h$, into which the spring $g$ of the seat G may be inserted, and thus securely fasten the seat to the truck without other appliances, and can as readily be removed when not needed.

At one side of the rear end of the pole F, I securely fasten a piece of wood or other suitable material, and place a plate of metal, $x$, over this and the end of the pole, which plate has a hole, K, and bolt K', so that when I wish to use three horses abreast the hammer-strap J may be set over and secured to bolt K', and the long double-tree fastened by bolt $j$, so that with proper connections the draft can be equalized. I sometimes use the axle C with a long slot or mortise through its center, so the standard can be adjusted laterally without removing bolt m; but I prefer the holes n n, because the nut sometimes loosens, and then the standard will not stay in place.

The axle can be changed ends with when wanted to use on a left-hand plow by simply removing the lower bolts in standard and braces.

I have found that a plow attached to the truck, as made and described with proper clevis-connections, as shown at S, Fig. 1, needs scarcely any holding except in rough stony soil; and to steady the plow (all that is necessary for smooth plowing) I attach to the handles of the plow, or the rod between them, as is most convenient, what I term a "plow-holder," P, which is made of two pieces of metal or other stiff material, extending rearwardly to a short axle, that has one or more wheels attached, that run in the furrow, the whole being held in proper position by the chain R, or other suitable device, running from said axle to the forward round of the plow or other convenient place for attaching the hook r, as shown in Fig. 1.

As the holder extends rearwardly the forward movement of the plow gives friction on the wheel or wheels of the holder, and by means of the chain R any desired tension may be given.

In going to and from the field the plow-clevis is raised on the standard the desired height, and, the chain of the holder being taken up so the holder stands upright, the plow is held above the ground, and made as portable as a cart.

It will readily be seen that I get nearly all the advantages of the sulky-plow, without its high cost and inflexible movement, while the truck is worth many times its cost on other implements. By making the axle so that I can depress one wheel into the furrow, I can use a much longer axle than those heretofore used on this class of trucks.

Having thus fully described my invention, what I claim as new, and desire to secure by Letters Patent, is—

1. In farm-trucks, the cast standard D, having cap E and mortise h formed thereon, in combination with spring g and seat G, constructed in the manner substantially as shown and described.

2. In combination with a plow attached to a farm-truck by a loose joint, the plow-holder P, having wheel or wheels Q and adjusting-chain R, substantially as shown and described.

3. The combination, in a farm-truck, of the main axle C, the adjustable arm-spindle c, and the cast standard D, having cap E and mortise h, with the gain at the bottom, and projection for attaching the braces L, substantially as shown and described.

In testimony that I claim the foregoing as my own invention I affix my signature in presence of two witnesses.

MILO HARRIS.

Witnesses:
C. B. JONES,
T. S. EDDY.